(12) United States Patent
Lee et al.

(10) Patent No.: US 10,273,875 B2
(45) Date of Patent: Apr. 30, 2019

(54) FUEL REFORMING SYSTEM FOR VEHICLE INTAKE AND EXHAUST LINE

(71) Applicants: Hyundai Motor Company, Seoul (KR); Kia Motors Corporation, Seoul (KR)

(72) Inventors: Seung Woo Lee, Seoul (KR); In Woong Lyo, Suwon-si (KR); Hong Kil Baek, Seoul (KR); Tae Won Lee, Incheon (KR); Woong Pyo Hong, Yongin-si (KR); Bokyung Kim, Yongin-si (KR); Ju Hun Lee, Gwangmyeong-si (KR); Jeong Hwa Cha, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/653,766

(22) Filed: Jul. 19, 2017

(65) Prior Publication Data

US 2018/0128164 A1     May 10, 2018

(30) Foreign Application Priority Data

Nov. 7, 2016     (KR) .......................... 10-2016-0147725

(51) Int. Cl.
*F02B 1/00* (2006.01)
*F02B 43/00* (2006.01)
(Continued)

(52) U.S. Cl.
CPC ............. *F02B 43/10* (2013.01); *F02M 27/02* (2013.01); *F02M 31/00* (2013.01); *F02B 1/00* (2013.01);
(Continued)

(58) Field of Classification Search
CPC ....................................................... F02B 43/10
See application file for complete search history.

(56) References Cited

U.S. PATENT DOCUMENTS

2003/0215640 A1* 11/2003 Ackerman ........... B01J 13/0091
428/405
2004/0144337 A1* 7/2004 Wakao ................... F02M 23/10
123/3
(Continued)

FOREIGN PATENT DOCUMENTS

JP     2004-251273 A     9/2004
JP     2010-101194 A     5/2010
(Continued)

*Primary Examiner* — Matthew J Merkling
(74) *Attorney, Agent, or Firm* — Morgan, Lewis & Bockius LLP

(57) ABSTRACT

A fuel reforming system for a vehicle intake and exhaust line that reforms fuel in a vehicle intake and exhaust line including an exhaust gas recirculation (EGR) apparatus that recirculates a portion of an exhaust gas of an engine and a recirculation line that transfers an exhaust gas that is recirculated by the exhaust gas recirculation apparatus to supply as an intake gas of the engine, may include a fuel reformer that mixes an exhaust gas that passes through the recirculation line with fuel and that reforms fuel that is mixed in the exhaust gas, wherein an insulation material is coated at a wall surface of the fuel reformer.

6 Claims, 3 Drawing Sheets

(51) Int. Cl.
  *F02B 43/10*    (2006.01)
  *F02B 51/00*    (2006.01)
  *F02M 27/00*    (2006.01)
  *F02M 27/02*    (2006.01)
  *F02M 31/00*    (2006.01)

(52) U.S. Cl.
  CPC .............. *F02B 43/00* (2013.01); *F02B 51/00* (2013.01); *F02M 27/00* (2013.01); *Y02T 10/126* (2013.01)

(56) References Cited

U.S. PATENT DOCUMENTS

| | | | | |
|---|---|---|---|---|
| 2007/0186537 | A1* | 8/2007 | Elwart | F01N 3/10 60/285 |
| 2007/0238008 | A1* | 10/2007 | Hogan | B60R 13/08 219/458.1 |
| 2014/0260203 | A1* | 9/2014 | LaPointe | F01N 3/10 60/274 |
| 2014/0283762 | A1* | 9/2014 | Takeyama | F02M 27/02 123/3 |

FOREIGN PATENT DOCUMENTS

| | | |
|---|---|---|
| JP | 4992941 B2 | 8/2012 |
| KR | 10-0998918 B1 | 12/2010 |
| KR | 10-1262384 B1 | 5/2013 |

* cited by examiner

FUEL REFORMING SYSTEM FOR VEHICLE INTAKE AND EXHAUST LINE

CROSS-REFERENCE(S) TO RELATED APPLICATIONS

The present application claims priority to Korean Patent Application No. 10-2016-0147725 filed on Nov. 7, 2016, the entire contents of which are incorporated herein for all purposes by this reference.

BACKGROUND OF THE INVENTION

Field of the Invention

The present invention relates to a fuel reforming system for a vehicle intake and exhaust line. More particularly, the present invention relates to a fuel reforming system for a vehicle intake and exhaust line that reforms fuel using a high temperature of a recirculation exhaust gas.

Description of Related Art

In general, for reduction of a noxious exhaust gas an exhaust gas recirculation (EGR) system is mounted in a vehicle.

An EGR system is configured to circulate a portion of an exhaust gas that is discharged from an engine as an intake gas to reduce an oxygen amount within a mixer, to reduce an exhaust amount of an exhaust gas, and to reduce an amount of harmful material within the exhaust gas.

Further, because an exhaust gas that is discharged from the engine is in a high temperature state, when using the heat energy thereof, efficiency of the engine can be improved.

A fuel reformer is a device that changes a characteristic of fuel using a catalyst, and, to increase combustion efficiency or activate a post-processing apparatus, the fuel reformer may be applied.

However, when a fuel reformer generally requiring a high temperature heat in a catalyst reaction is applied to a general engine, a separate heat supply source may be required. Therefore, layout for the disposition of the fuel reformer is limited, thereby the engine has a complex configuration and an entire weight of a vehicle may increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel reforming system for a vehicle intake and exhaust line that may apply a fuel reformer while overcoming a layout restriction.

The present invention further provides a fuel reforming system for a vehicle intake and exhaust line that can easily secure a high temperature necessary for a fuel reformer without a separate apparatus.

Various aspects of the present invention are directed to providing a fuel reforming system for a vehicle that reforms fuel in a vehicle intake and exhaust line. The fuel reforming system includes an exhaust gas recirculation (EGR) apparatus that recirculates a portion of an exhaust gas of an engine, and a recirculation line that transfers an exhaust gas that is recirculated by the exhaust gas recirculation apparatus to supply as an intake gas of the engine.

The fuel reforming system for the vehicle intake and exhaust line includes a fuel reformer that mixes an exhaust gas that passes through the recirculation line with fuel and that reforms fuel that is mixed in the exhaust gas.

An insulation material may be coated at a wall surface of the fuel reformer.

A thickness of the coated insulation material may be 100 µm to 300 µm.

The insulation material may contain aerogel of 15 wt. % or more.

The fuel reformer may include: an inlet that receives an exhaust gas that passes through the recirculation line; a mixing portion that mixes an exhaust gas that is entered into the inlet with fuel; a reforming portion that reforms fuel that is mixed with an exhaust gas in the mixing portion; and an outlet that discharges an exhaust gas that passes through the reforming portion to the recirculation line.

In the mixing portion, a mixing chamber, which is a volume that communicates with the inlet to mix an exhaust gas and fuel, may be formed, and in the mixing chamber an injector that ejects fuel may be provided.

A disposition region of a catalyst that reforms fuel may be formed within the reforming portion.

The catalyst may reform fuel to have a high hydrogen content.

An insulation material may be coated at the inlet, the outlet, the mixing portion, and the reforming portion.

The insulation material may be coated at an internal surface of the inlet, the outlet, the mixing portion, and the reforming portion.

The insulation material may be coated in the recirculation line.

The insulation material may be coated at an internal surface of the recirculation line.

The insulation material may contain aerogel of 15 wt. % or more.

A coating thickness of the insulation material may be 100 µm to 300 µm.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
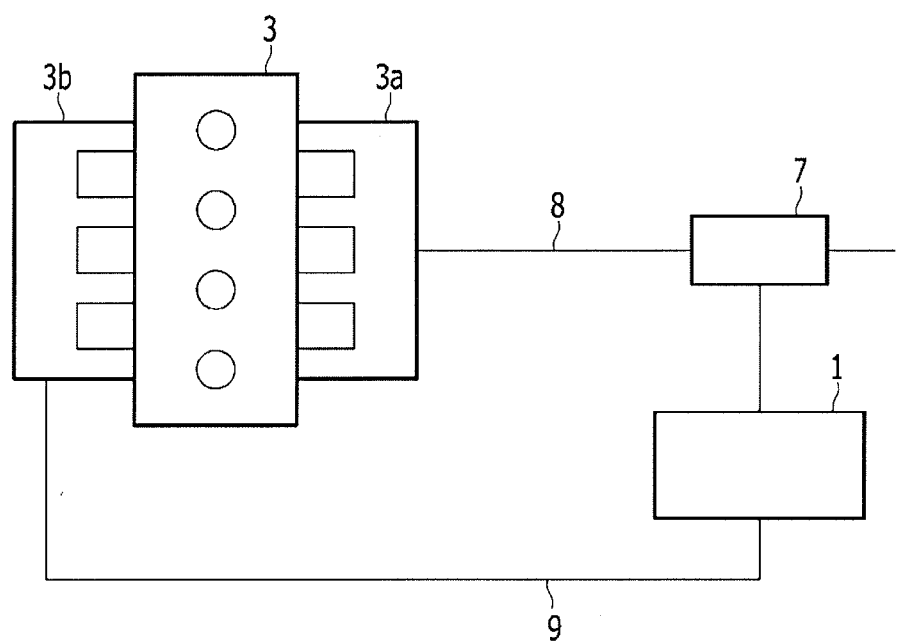
FIG. 1 is a block diagram illustrating a configuration of a fuel reforming system for a vehicle intake and exhaust line according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for explain, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be determined in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a block diagram illustrating a configuration of a fuel reforming system for a vehicle intake and exhaust line according to an exemplary embodiment of the present invention.

As shown in FIG. 1, a fuel reforming system for a vehicle intake and exhaust line according to an exemplary embodiment of the present invention reforms fuel using some exhaust gases that are recirculated from an exhaust line 8. The reforming system enables an exhaust gas that passes through an exhaust manifold 3a of an engine 3 to be discharged to the outside to supply the reformed fuel to an intake manifold 3b of the engine 3. Further, a fuel reforming system for a vehicle intake and exhaust line according to an exemplary embodiment of the present invention includes an exhaust gas recirculation (EGR) apparatus 7 and a fuel reformer 1.

The EGR apparatus 7 is disposed on the exhaust line 8. Here, the EGR apparatus 7 selectively circulates a portion of an exhaust gas that is discharged from the engine 3 as an intake gas and will become apparent to a person of ordinary skill in the art, therefore a detailed description thereof will be omitted. An exhaust gas that is selectively recirculated by the EGR apparatus 7 is supplied to the intake manifold 3b through a recirculation line 9.

The fuel reformer 1 is disposed on the recirculation line 9. That is, an exhaust gas that is recirculated by the EGR apparatus 7 is supplied to the intake manifold 3b via the fuel reformer 1.

Hereinafter, a configuration of the fuel reformer 1 will be described in detail with reference to FIG. 2 and FIG. 3.

Figure 2:
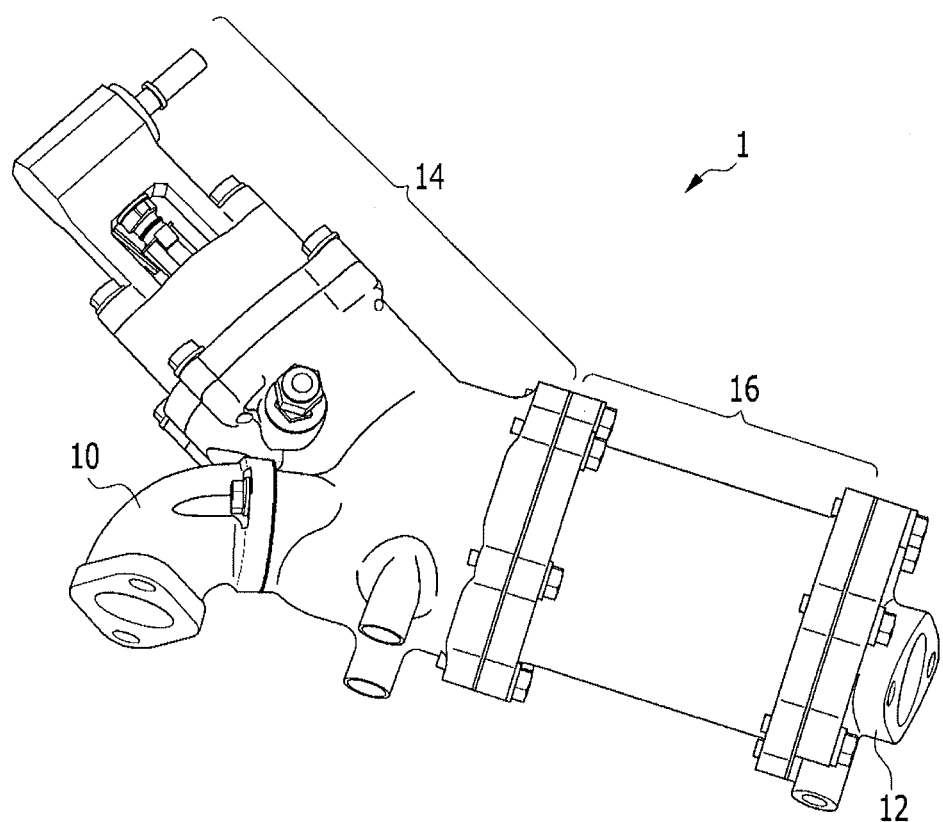
FIG. 2 is a perspective view of a fuel reformer according to an exemplary embodiment of the present invention.

FIG. 2 is a perspective view of a fuel reformer according to an exemplary embodiment of the present invention.

As shown in FIG. 2, the fuel reformer 1 includes an inlet 10, an outlet 12, a mixing portion 14, and a reforming portion 16.

The inlet 10 receives a recirculation exhaust gas that passes through the recirculation line 9 to the fuel reformer 1.

The outlet 12 discharges a recirculation exhaust gas that has entered into the inlet 10 from the fuel reformer 1. Further, a recirculation exhaust gas that is discharged from the fuel reformer 1 is continuously supplied to the intake manifold 3b through the recirculation line 9.

The mixing portion 14 mixes a recirculation exhaust gas and fuel that have entered into the fuel reformer 1.

The reforming portion 16 reforms fuel that is mixed with a recirculation exhaust gas. That is, a recirculation exhaust gas that passes through the recirculation line 9 sequentially passes through the outlet 12, the mixing portion 14, the reforming portion 16, and the outlet 12. Here, for rigidity securement, a housing 14h of the mixing portion 14 and a housing 16h of the reforming portion 16 may include a metal material.

Figure 3:
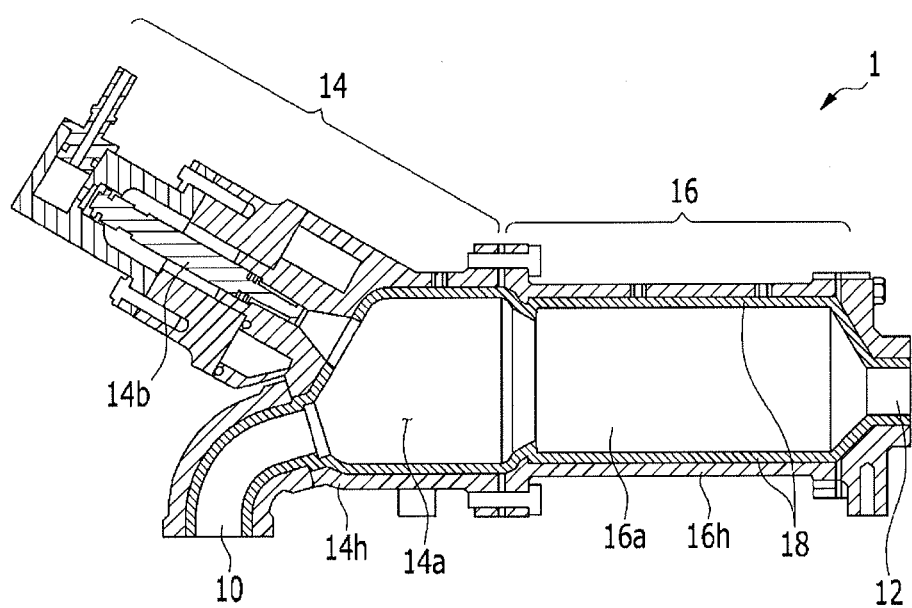
FIG. 3 is a cross-sectional view of a fuel reformer according to an exemplary embodiment of the present invention.

FIG. 3 is a cross-sectional view of a fuel reformer according to an exemplary embodiment of the present invention.

As shown in FIG. 3, the mixing portion 14 includes a mixing chamber 14a and an injector 14b. The reforming portion 16 includes a catalyst 16a.

The mixing chamber 14a is an internal volume of a mixing portion housing 14h in which fuel and an exhaust gas are mixed. Further, the mixing chamber 14a communicates with the inlet 10. That is, a recirculation exhaust gas is entered into the mixing chamber 14a through the inlet 10.

To eject fuel to the mixing chamber 14a, the injector 14b is mounted in the mixing portion housing 14h. Here, to efficiently mix the fuel and an exhaust gas, a mounting location of the injector 14b and an ejection direction of the fuel may be adjusted according to a design of a person of an ordinary skill in the art.

The catalyst 16a is disposed within the reforming portion housing 16h. Further, a recirculation exhaust gas that passes through the mixing chamber 14a is discharged to the outlet 12 via an internal volume of the reforming portion housing 16h in which the catalyst 16a is disposed. In the present case, non-combustion fuel and mixed fuel that are contained in a recirculation exhaust gas react with the catalyst 16a to be reformed.

Here, reforming of fuel may mean an increase of a hydrogen content within fuel. In the present way, when a hydrogen content increases within the fuel, an activation time of an exhaust gas post-processing apparatus may be shortened. Upon initial cool starting, in a gasoline engine in which post-processing of an exhaust gas is weak, reduction of an activation time of the exhaust gas post-processing apparatus enables discharge of a noxious exhaust gas to effectively be reduced. Further, as fuel that is reformed to increase a hydrogen content has a high combustion rate and explosion force, a performance of the engine 3 can be improved.

However, a temperature of a general exhaust gas may be lower than a temperature necessary when the catalyst 16a reacts with the fuel to smoothly generate hydrogen. For example, a hydrogen generation amount when a temperature of the catalyst 16a is 750° C. is less than 50% of a hydrogen generation amount when a temperature of the catalyst 16a is 820° C. To enhance the present generation amount, the fuel reformer 1 further includes an insulation material 18.

The insulation material 18 is coated at the inlet 10, the outlet 12, the mixing portion housing 14h, and the reforming portion housing 16h. FIG. 3 illustrates that the insulation material 18 is coated at an internal surface of the inlet 10, the outlet 12, the mixing portion housing 14h, and the reforming portion housing 16h, but the present invention is not limited thereto. When the insulation material 18 is coated at an external surface of the inlet 10, the outlet 12, the mixing portion housing 14h, and the reforming portion housing 16h, a heat loss to the inlet 10, the outlet 12, the mixing portion housing 14h, and the reforming portion housing 16h of a metal material may occur. Further, the insulation material 18 may be coated at an internal surface of the recirculation line 9.

The insulation material 18 may contain aerogel of 15 wt. % (w/o, weight percent) or more. Further, the insulation material 18 may be coated in a thickness of 100 μm to 300 μm. Here, aerogel is a high porous nanostructure body having a better insulating property than that of ceramic.

As described above, according to an exemplary embodiment of the present invention, as a fuel reformer functions using a high temperature of an exhaust gas, a high temperature necessary for the fuel reformer without an additional apparatus can be secured. Therefore, engine efficiency enhances without an increase of an entire vehicle weight and thus fuel consumption can be improved.

Further, by maximizing high temperature preservation of an exhaust gas that is supplied to the fuel reformer, a performance of the fuel reformer can be improved.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel reforming system for a vehicle intake and exhaust line that reforms fuel in the vehicle intake and exhaust line having an exhaust gas recirculation (EGR) apparatus that recirculates a portion of an exhaust gas of an engine and a recirculation line that transfers the exhaust gas that is recirculated by the exhaust gas recirculation apparatus to supply as an intake gas of the engine, the fuel reforming system comprising:

a fuel reformer that mixes an exhaust gas that passes through the recirculation line with fuel and that reforms fuel that is mixed in the exhaust gas, wherein an insulation material is coated at a wall surface of the fuel reformer, and wherein a thickness of the coated insulation material is 100 μm to 300 μm, wherein the fuel reformer includes:

an inlet that receives an exhaust gas that passes through the recirculation line;

a mixing portion that mixes an exhaust gas that is entered into the inlet with fuel;

a reforming portion that reforms fuel that is mixed with an exhaust gas in the mixing portion; and an outlet that discharges an exhaust gas that passes through the reforming portion to the recirculation line, and wherein the insulation material is coated at an internal surface of the inlet, the outlet, the mixing portion, and the reforming portion, and wherein in the recirculation line, the insulation material is coated.

2. The fuel reforming system of claim 1, wherein the insulation material contains aerogel of 15 wt. % or more.

3. The fuel reforming system of claim 1, wherein in the mixing portion, a mixing chamber, which is a region that is communicated with the inlet to mix an exhaust gas and fuel is formed, and in the mixing chamber, an injector that ejects fuel is provided.

4. The fuel reforming system of claim 1, wherein a disposition region of a catalyst that reforms fuel is formed within the reforming portion.

5. The fuel reforming system of claim 4, wherein the catalyst reforms fuel to have a high hydrogen content.

6. The fuel reforming system of claim 1, wherein the insulation material is coated on an internal surface of the recirculation line.

* * * * *